A. B. MOE.
FEED HOPPER.
APPLICATION FILED MAY 1, 1914.
1,221,355. Patented Apr. 3, 1917.
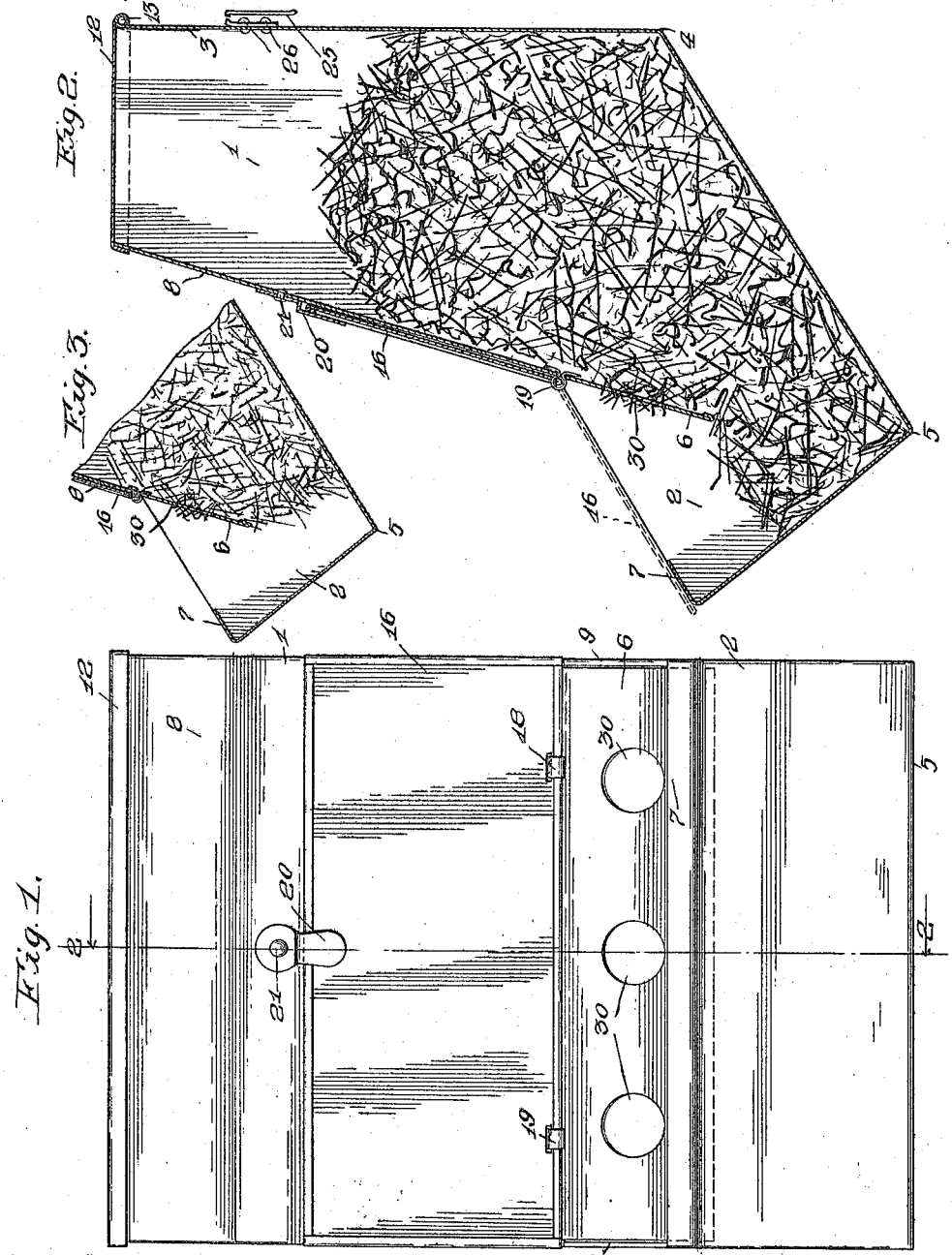

UNITED STATES PATENT OFFICE.

AARON B. MOE, OF CHICAGO, ILLINOIS, ASSIGNOR TO OTIS & MOE MANUFACTURING COMPANY, A CORPORATION OF ILLINOIS.

FEED-HOPPER.

1,221,355.  Specification of Letters Patent.  Patented Apr. 3, 1917.

Application filed May 1, 1914. Serial No. 835,674.

*To all whom it may concern:*

Be it known that I, AARON B. MOE, a citizen of the United States, residing at 5340 West Madison street, in Chicago, county of Cook, and State of Illinois, have invented new and useful Improvements in Feed-Hoppers, of which the following is a specification.

The object of my invention is to provide a feed hopper for chickens and other animals which will contain a reservoir from which the feed will automatically be fed into a trough to which the chickens have access. A further object of my invention is to provide means by which, should the bottom of the reservoir become clogged and the trough emptied, the chickens or other animals in their attempt to get food will loosen the clogged material thus permitting the food to again flow from the reservoir and refill the trough. Further objects of my invention are to provide covers for the reservoir and for the trough which will serve to protect from rodents the contents of the device when it is not in use.

A device embodying the principles of the present invention is shown in the accompanying drawings in which:

Figure 1 is a front elevation.

Fig. 2 is a cross section on the line 2—2 of Fig. 1.

Fig. 3 is a fragmentary view of Fig. 2 on a smaller scale showing the feed clogged at the lower part of the reservoir and the trough empty.

As shown in said drawings the device consists of a reservoir 1 and trough 2 integrally made of galvanized iron or other suitable material. The reservoir 1 consists of a back wall 3 which is vertical from its top to the corner 4 about one-third distant from the bottom and is then bent forward to form an angle of about 135 degrees to a corner 5 almost directly under the lower edge of the apron 6 hereinafter described. From the corner 5 it is bent upward at an angle of about 90 degrees to form the trough 2 and then bent back at an angle of about 90 degrees for a short distance forming the edge 7. The front wall 8 of the reservoir 1 diverges from the back wall 3 from the top to the bottom and is continued into the trough 2 in the form of the apron 6. Vertical walls 9 and 10 form the sides of the reservoir and trough. A lid 12, hinged at 13 to the top edge of the back wall 3, is provided to close the top of the reservoir. A cover 16 hinged by the staples 18 and 19 at the bottom edge of the front wall 8 is provided as a cover for the trough 2 and is shown in its closed position in dotted lines in Fig. 2. A catch 20 attached to the front wall 8 by means of the rivet 21 upon which it may be rotated serves to hold the cover 16 in its opened position. A hook 25 for hanging the device to a wall is attached to the back wall 3 in the center near its upper edge by the rivets 26, 26. Circular openings 30, 30 are provided in the apron 6. The purpose of these openings will be hereinafter explained. It will be noted (Figs. 2 and 3) that the bottom part of the reservoir 1 is constricted by the apron 6 projecting into the trough, *i. e.*, the smallest part of the reservoir is just back of this apron. From the above it is apparent that if the feed in the reservoir becomes clogged and ceases to flow into the trough, such clogging in all likelihood will occur at the smallest part of the reservoir or just back of the apron 6. Such clogging is shown in the fragmentary view Fig. 3 which represents the smallest part of the reservoir 1 and shows the food clogged at this point and the trough 2 completely emptied of feed. When such a condition prevails it is evident (see Fig. 3) that the only food exposed to view will be that at the openings 30, 30. The chickens or other animals will naturally peck at this food and pull some of it out. Since these holes are near the bottom or smallest part of the reservoir 1 it is evident that such pecking and pulling out of the food through the openings 30, 30 will relieve the congestion and thus permit the food to again flow out of the bottom of the reservoir and refill the trough 2.

I claim as my invention:

1. In a feed hopper, a back wall and a front wall diverging from the upper to the lower part of the feed hopper, a bottom wall extending from the lower edge of the back wall diagonally forward and downward, another bottom wall joining the lower edge of the first and extending diagonally upward and forward, the two bottom walls forming a trough and the front wall extending downwardly into such trough, with a restricted opening below it for the escape of feed into the forward part of the trough, and openings through the extended portion of the front wall to provide additional access to the feed in the hopper.

2. In a feed hopper, a back wall and a front wall diverging from the upper to the lower part of the feed hopper, a bottom wall extending from the lower edge of the back wall diagonally forward and downward, another bottom wall joining the lower edge of the first and extending diagonally upward and forward, the two bottom walls forming a trough and the front wall extending downwardly into such trough, with a restricted opening below it for the escape of feed into the forward part of the trough, openings through the extended portion of the front wall to provide additional access to the feed in the hopper, and a hinged cover over the upper edge of the trough.

In witness whereof, I have hereunto subscribed my name in the presence of two witnesses this 27th day of April, 1914.

AARON B. MOE.

Witnesses:
W. T. PUFERTON,
MARK E. OTIS.

Copies of this patent may be obtained for five cents each, by addressing the "Commissioner of Patents, Washington, D. C."